United States Patent [19]

Martinez

[11] 4,238,687
[45] Dec. 9, 1980

[54] HIGHWAY TURBINE

[76] Inventor: Santiago Martinez, 7720 Lemon Tree La., Liverpool, N.Y. 13088

[21] Appl. No.: 965,177

[22] Filed: Nov. 30, 1978

[51] Int. Cl.³ .............................................. H02P 9/04
[52] U.S. Cl. .................................................. 290/1 R
[58] Field of Search ........................ 290/1 R; 417/229

[56] References Cited

U.S. PATENT DOCUMENTS

| 1,916,873 | 7/1933 | Wiggins | 290/1 R |
| 3,885,163 | 5/1975 | Toberman | 290/1 R |

FOREIGN PATENT DOCUMENTS 1332202 10/1973 United Kingdom .................... 290/1 R Primary Examiner—J. V. Truhe
Assistant Examiner—John B. Conklin
Attorney, Agent, or Firm—Bruns & Jenney

[57] ABSTRACT

A system for generating power from the passage of motor vehicles over a roadway which includes a highly efficient linkage for connecting a treadle or rocker plate mounted in the roadbed with one or more turbine wheels. The turbine wheels are affixed to a common shaft that is adapted to drive a generator for providing work. The linkage is constructed so that losses throughout the system are minimized whereby a relatively high percentage of the total input energy is converted to useful work.

14 Claims, 6 Drawing Figures

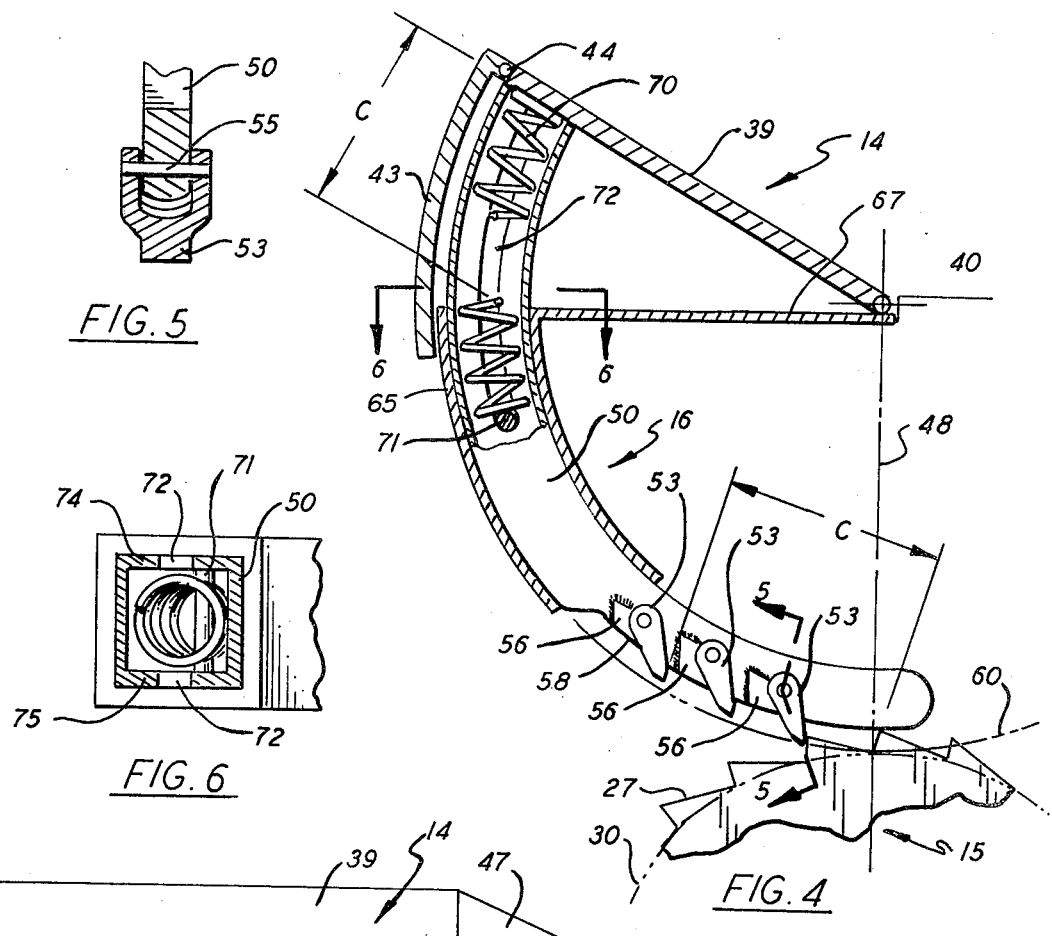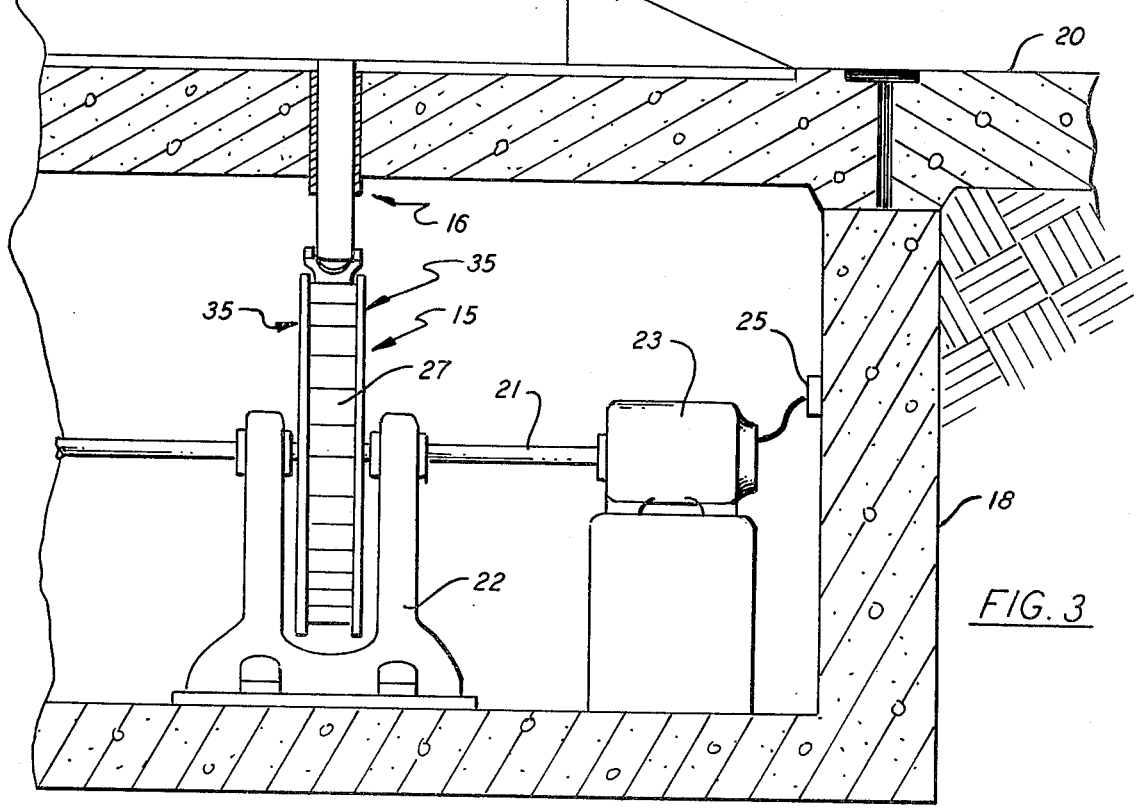

HIGHWAY TURBINE

BACKGROUND OF THE INVENTION

This invention relates to an improved system for generating power from the movement of motor vehicles over a roadway.

The most pertinent prior art known to the applicant at the time of filing this application is to be found in the following U.S. Pats. No. 1,312,131; No. 1,916,873; No. 2,020,361; No. 3,885,163; No. 4,081,224. As illustrated in many of the above-noted patents, it has long been recognized that the potential energy contained in moving vehicles can be converted into kinetic energy for providing useful work. However, the efficiency of most of these systems has proven to be relatively low because of the many friction losses typically built into the equipment.

In many major countries of the world the automobile is the primary mode of transportation. Roadways, particularly in and about larger cities, carry a relatively steady stream of traffic during a large part of each day. As can be seen, these moving vehicles represent a tremendous source of unused energy which, in light of the present energy shortage, could be utilized to supply much needed power.

SUMMARY OF THE INVENTION

It is therefore an object of the present invention to conserve energy.

Another object of the present invention is to capture the potential energy that is typically wasted as a motor vehicle moves over a roadway.

Yet another object of the present invention is to improve apparatus for converting the potential energy developed by a moving vehicle into kinetic energy for performing useful work.

Still another object of the present invention is to provide highly efficient equipment for converting the potential energy found in a moving vehicle into useful work.

These and other objects of the present invention are attained by means of a system for generating power from the passage of a motor vehicle over a roadway which includes an elongated actuator plate extending transversely across the roadway that is supported along one edge by means of a pivot so that the plate is able to move between a first inclined position above the surface of the roadbed and a second horizontal position wherein the plate is substantially in coplanar alignment with the surface of the road, at least one turbine wheel rotatively mounted upon a horizontal shaft below the surface of the road directly between the plate, the wheel having ratchet teeth formed about its outer periphery which are equally spaced about a common root circle, the axis of rotation of the wheel and the pivot point of the plate both lying on the same commonly shared centerline, an arcuate shaped actuator arm being affixed at one end to the bottom of the plate for pivotal movement therewith, the arm having a series of downwardly extended pawl elements mounted on the opposite end thereof that are arranged to engage the ratchet teeth and turn the wheel when the plate is moved from the first position towards the second position and to pass over the teeth in disengagement therewith when the plate is moved in the opposite direction, the tips of the downwardly extended pawl elements describing the cord of a circle that is substantially tangent with the root circle of the ratchet teeth at the common centerline, and biasing means for restoring the plate to a first position upon its being depressed into a second position by the passage of a motor vehicle thereover.

BRIEF DESCRIPTION OF THE DRAWINGS

For a better understanding of these and other objects of the present invention reference is had to the following detailed description of the invention which is to be read in conjunction with the following drawings, wherein;

FIG. 3 is a partial end view in section of the apparatus shown in FIG. 2 further illustrating the equipment contained therein;

FIG. 4 is an enlarged view of the turbine actuating linkage showing the linkage affixed to a road-mounted treadle and being operatively associated with a turbine wheel;

FIG. 5 is a section taken along lines 5—5 in FIG. 4; and

FIG. 6 is a section taken along lines 6—6 in FIG. 4.

DESCRIPTION OF THE INVENTION

Figure 1:
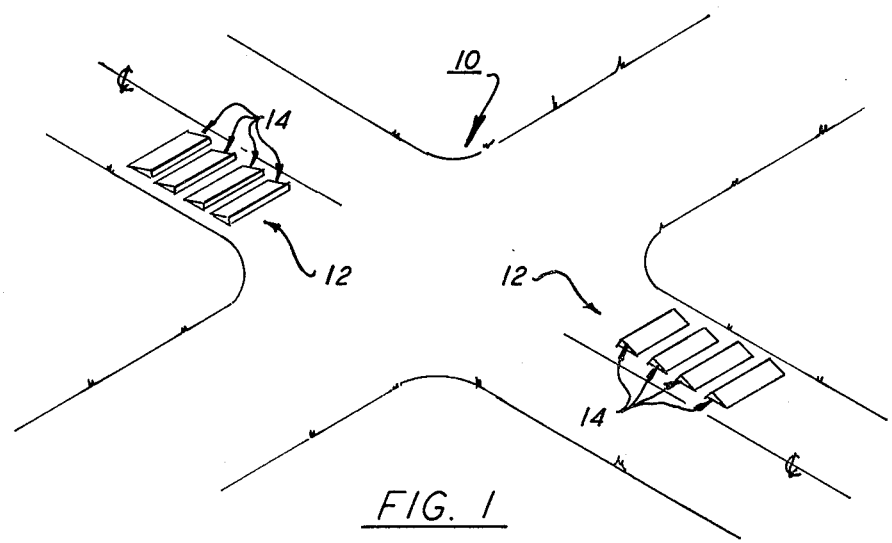
FIG. 1 is a perspective view of a highway intersection showing a series of transversely mounted treadles positioned in the roadway on both sides of the highway.

In FIG. 1 there is shown a roadway intersection generally referenced 10 having a number of driving lanes in which are installed a series of motion converting means 12. Each motion converting means is capable of efficiently converting the linear motion of a motor vehicle moving along a highway into a rotational motion. As will be explained in greater detail below, the converting means are coupled to an electrical generator mounted within access pits located below the highway surface, with each generator being electrically coupled together to provide a common output.

Each of the motion converting means includes a treadle or actuating plate which is positioned transversely across one lane of the roadway some distance back from the intersection in the direction of traffic flow. The converting means are set back from the intersection whereby the vehicles moving toward the intersection will be decelerating as they move over the treadles. This insures that only the vehicles' momentum and not its engine power is used as an input source. Sufficient distance is allocated so that stopped or stalled motor vehicles will normally be prevented from resting directly upon one or more of the actuating plates.

Referring now more specifically to FIGS. 2-6, the apparatus of the present invention includes an actuating treadle 14, as disclosed above, a turbine wheel 15 and an extremely simple but highly efficient connector arm 16 that is arranged to operatively connect the plate to the turbine wheel. The turbine wheel is mounted within an access pit 18 located directly below the treadle beneath the surface of the roadbed 20. Preferably there are two turbine wheels mounted in each pit with the wheels being spaced apart so they are located approximately under the wheels of a typical motor vehicle moving over the roadway. It should therefore be understood that each turbine in a set will be individually connected to a commonly shared actuator plate by means of an individual connector arm. In assembly, the connector arms are of identical construction and only one of these units will therefore be described in greater detail below.

Each turbine wheel in a set in supported upon a horizontally aligned shaft 21 that is rotatably supported within bearings (not shown) contained in a mounting stanchion 22. The shaft, in turn, is connected by any suitable means to a generator 23 which is situated within the pit to one side of the roadway. The output of each generator in the system is shunted to a common buss bar 25 as best seen in FIG. 3.

In practice, the turbine wheel contains a series of equally spaced ratchet teeth 27 formed about the outer periphery thereof. Each tooth in the series is brought to a mutually shared radial depth that is described by root circle 30. The center of the root circle is located at the rotational center of the turbine wheel. The turbine wheel is constructed in the form of an annular fly wheel having a preponderance of its mass contained about its outer rim 31 whereby the wheel tends to keep rotating once placed in motion and even out fluctuations in the rotational speed of the wheel. The rim of the wheel is connected to hub 32 via a series of spokes 33. As best seen in FIG. 3, a pair of end plates 35—35 may also be provided to enclose the side walls of the ratchet teeth.

The actuator plates or treadle assemblies 14 are pivotably supported in the roadbed above the access pit. Each treadle consists of a flat plate 39 that extends longitudinally across the roadway to transverse one lane of travel. The longitudinal side edge of the plate facing the oncoming traffic is rotatably supported in the roadbed by means of a pivot pin 40. The plate is movably contained within a recess 42 formed in the roadway whereby the plate is rotatable into a horizontal position wherein the top surface of the plate is in coplanar alignment with the top surface of the roadbed. A front shield 43 is hinged by means of a pin 44 to the front edge of the plate. The shield, in turn, is slidably received within a passageway 45 passing downwardly at an angle below the surface of the road. The shield cooperates with a pair of triangular shaped side panels 47—47 (FIG. 3) which are connected to the outboard ends of the actuator plate to prevent dirt and other forms of road contamination from falling into the pit. Sufficient weep holes and drainage channels are provided in and about the access pit to carry off surface water and melting snow and thus protect the working components of the system against damage.

Figure 2:
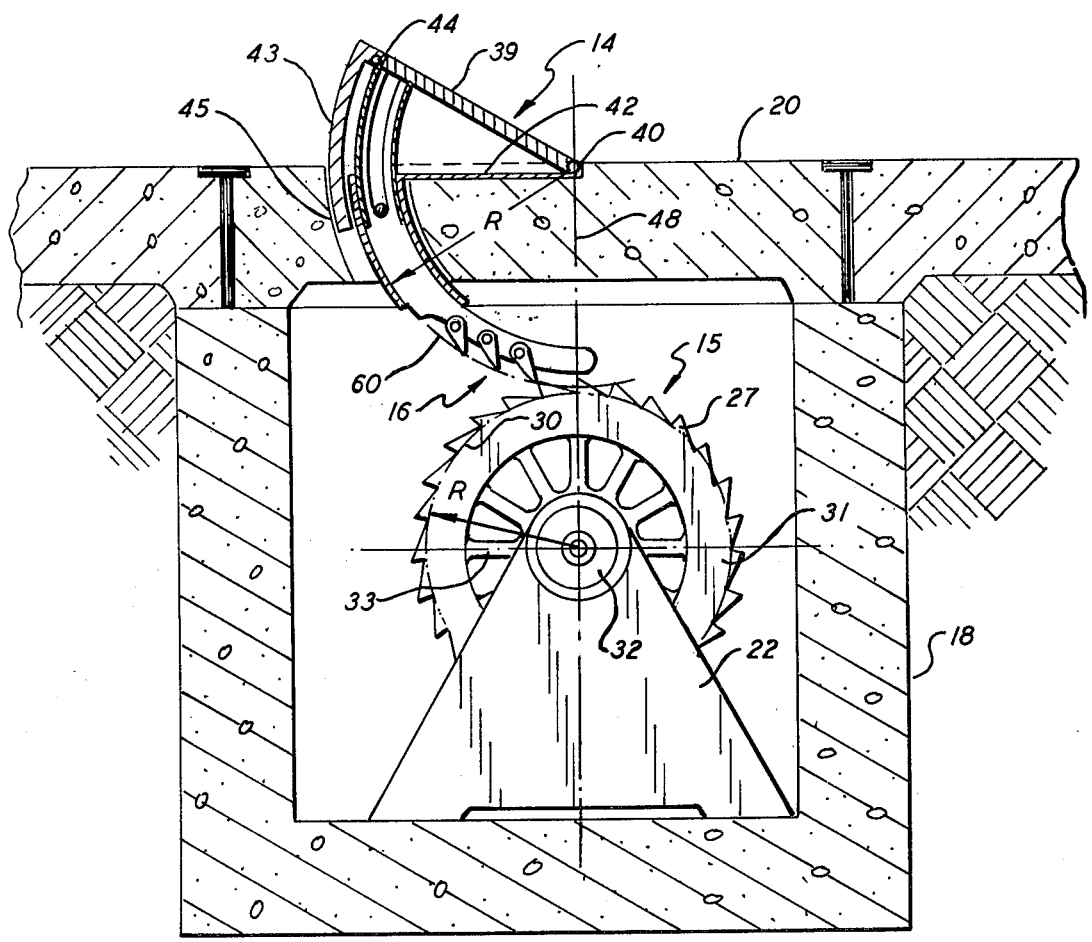
FIG. 2 is an enlarged side elevation in section showing a mechanically actuated turbine wheel and means to actuate said turbine wheel by the passage of a motor vehicle over the roadway shown in FIG. 1.

As best seen in FIG. 2, the pivot pin 40 of the actuating plate is located upon the vertical centerline 48 of the turbine wheel or wheels above the access pit. The reason for this particular arrangement will become apparent from the disclosure below.

As noted, the actuator plates 39 of the power generator unit is connected to the turbine wheel or wheels via connecting arms 50. Each arm is fabricated from a hollow rectangular member that is arcuate in form. One end of the arm is securely affixed by any suitable means to the bottom surface of the actuator plate to enable the arm to be driven by the plate as it moves about the pivot pin 40. The center of the arcuate shaped arm member, in assembly, lies at the center of the plate pivot pin 40. Accordingly, as the arm is driven by the plate it is caused to move along a circular path of travel that is centered at the pivot point of the plate. The opposite or distal end of the arm contains a series of pawl elements 53 that are movably supported within the arm by means of pins 55 (FIG. 5). In practice, each pawl element is a bifurcated lug, the two legs of which encompass the arm 50 and in which are supported the pin 55 in assembly. Stops 56, which depend outwardly from the side walls of the actuator arm, are arranged to engage each of the pawl elements in arresting contact to rigidly support the elements in the operative position as shown in the drawings. A cutback 58 is also provided at the distal end of the actuator arm to accommodate the main body of each pawl element. When the pawls are resting against the stops, the tips of the elements describe a cord of a circle 60 that is centered at the pivot point 40 of the plate.

The main body of the arm 50 is slidably carried within a guide member 65. The guide is suspended within the pit below the plate 39 and is secured to the horizontal plate 67 which forms the bottom wall of recess 42. Some freedom of motion may be afforded to the guide member to permit it to be positioned within the pit whereby the guide can be adjusted in assembly to prevent binding of the coacting components.

A coiled compression spring 70 is carried inside of the hollow connector arm 50. The spring is seated upon a stationary bar 71 that passes through arcuate shaped slotted hole 72–72 formed in the opposing side walls 74, 75 of the arm 50 (FIG. 6). The opposite end of the spring coil is loaded in biasing contact against the bottom surface of the actuator plate so as to urge the plate upwardly towards a raised position as shown in FIG. 4. The bar also acts as a stop in the system which, when bottomed against the lower wall of the slotted holes, regulates the height to which the plate can be raised. The spring rate is set to a predetermined limit so that the spring will deliver enough energy to restore the plate to the raised position after it has been depressed by the passage of a motor vehicle. The spring is tuned so that it does not absorb an excessive amount of energy from the total potential energy delivered into the system thereby making as much energy as possible available to perform useful work. Preferably, the spring has a rapid response time so that it can quickly restore the plate to a raised position after it has been released by the wheels of the motor vehicle.

The outside circular cord 60 described by the tips of the pawl elements passes adjacent to and in tangential relationship with the root circle of the turbine wheel at the centerline 48 of the system. Enough clearance is provided between the tip of the pawl elements and the root of the receiving ratchet tooth to prevent the pawl elements from bottoming against the turbine wheel. As the arm is depressed, the pawl elements are caused to move immediately into active engagement with the ratchet teeth causing the turbine wheel or wheels to be rotated in a clockwise direction. The throw or length of movement of the actuator plate, as depicted by the "C" dimension in FIG. 4, is equal to the working distance "C" of the pawls in relation to the ratchet teeth as measured along the cord 60. By maintaining these two distances about equal, useless or lost motion, which can rob the system of energy is avoided. This relationship can be conveniently held by simply maintaining the radius of root circle 30 about equal to the radius of cord 60 described by the tips of the pawl elements.

As should be evident from the disclosure above, the apparatus of the present invention is able to efficiently convert the linear motion of a moving motor vehicle directly into a rotational motion with the use of a minimum amount of component parts as well as a minimum amount of translational movement. By minimizing both the number of parts involved and the motion thereof, a preponderance of the total energy put into the system by the moving motor vehicles is converted to usable work. While this invention has been described with reference to the structure disclosed herein, it is not necessarily confined to the details as set forth and this application is intended to cover any modifications or changes as may come within the scope of the following claims.

I claim:

1. Apparatus for generating power from the passage of a motor vehicle over a roadway including
   - an actuator plate extending transversely across the roadway and being supported at one of its longitudinal side edges by means of a pivot so that the plate is movable between a first inclined position wherein the plate is raised above the surface of the roadway and a second horizontal position wherein the plate is substantially in coplanar alignment with the surface of the road,
   - at least one turbine wheel rotatably mounted below the surface of the road directly beneath the plate upon a horizontal shaft, the wheel having ratchet teeth formed along its outer periphery that are equally spaced about a common root circle, and the axis of rotation of said wheel and the pivot point of said plate both lying upon a common centerline,
   - an arcuate shaped arm associated with said at least one turbine wheel being affixed at one end to the bottom of said plate for pivotable movement therewith and having at least one extended pawl element mounted on the opposite end thereof that is arranged to engage the ratchet teeth on the turbine wheel and turn the wheel when said plate is moved from said first position toward said second position and to pass over said teeth in disengagement therewith when said plate is moved in the opposite direction, the tip of the pawl element describing the cord of a circle that is substantially tangent with the root circle of the ratchet teeth at said common centerline, and
   - means to restore the plate to said first position upon its being moved toward the second position.

2. The apparatus of claim 1 wherein the radius of the cord described by the tip of the pawl element is substantially equal to the radius of the root circle of the ratchet wheel.

3. The apparatus of claim 1 wherein the means for restoring the plate to a first position is a biasing spring that is arranged to act against the bottom surface of the plate so as to urge the plate into said first position.

4. The apparatus of claim 3 wherein the spring is carried within the arm so as to act along the central axis thereof.

5. The apparatus of claim 2 wherein the length of travel of said plate between the two positions is substantially equal to the total tooth engaging distance of said pawl element as measured along the cordal radius of the pawl tip.

6. The apparatus of claim 1 wherein two turbine wheels are mounted upon a single horizontally aligned shaft below the plate.

7. The apparatus of claim 1 wherein the distance between the axial centerline of the turbine shaft and the pivot point of the actuator plate is about two times the radius of the root circle of the ratchet teeth.

8. The apparatus of claim 1 wherein the turbine wheel is a flywheel having a large portion of its total mass located about its outer periphery.

9. The apparatus of claim 8 wherein each of said at least one pawl element includes a downwardly extended lug that is secured to the arm by a hinge pin and a stop means positioned upon said arm for arresting the lug and supporting the lug in a tooth engaging position as the plate is moved from the first position toward the second position.

10. Apparatus for generating power from the passage of a motor vehicle over the roadway including
    - an actuator plate extending transversely across the roadway and being pivotably supported at one edge by a pivot pin so that the plate is movable between a first inclined position wherein the plate is raised above the roadway and a second horizontal position wherein the plate is substantially in coplanar alignment with the surface of the road,
    - at least one turbine wheel rotatably mounted upon a horizontal shaft below the surface of the road directly beneath said plate, at least one turbine wheel containing a series of equally spaced ratchet teeth formed about its periphery, the teeth being brought to the same radial depth along a common root circle and the axis of rotation of the wheel and the pivot axis of said plate lying on a common centerline,
    - an arcuate shaped arm secured at one end to the bottom of said plate for movement therewith and having a series of downwardly extended pawl elements connected to the opposite end of the arm, the extended tips of said pawl elements describing a cord of a circle whose center is coaxially aligned with said pivot pin and whose radius is substantially equal to the radius of the root circle,
    - a guide means for directing the arm back and forth along a path of travel so that the tips of the pawl elements move tangent to the root circle of the ratchet teeth as they pass through said horizontal centerline whereby the wheel is caused to turn when the plate is moved from the first position toward the second position and to disengage said teeth when the plate moves in the opposite direction,
    - a biasing means that is arranged to restore the plate to said first position after it has been moved toward said second position, and
    - a generator means coupled to said horizontal shaft for developing electrical energy when said wheel shaft is turned.

11. The apparatus of claim 10 having an adjusting means operatively connected to the guide means for positioning the guide in reference to the center of said pivot pin.

12. The apparatus of claim 10 wherein said biasing means is a spring mounted within the arm that is arranged to act between a stationary member and the bottom surface of the plate so as to urge the plate toward said first position.

13. The apparatus of claim 10 wherein the turbine wheel is a flywheel having a preponderance of its total mass located about its outer periphery.

14. The apparatus of claim 10 wherein two turbine wheels are connected to the actuator plate.

* * * * *